United States Patent [19]
Erdely

[11] 3,765,236
[45] Oct. 16, 1973

[54] APPARATUS FOR RECORDING SWELL FREQUENCY AND PROPAGATION DIRECTION OF WAVES

[75] Inventor: Ladislas Erdely, Paris, France

[73] Assignee: Agence Nationale de Valorisation de la Recherche, Paris, France

[22] Filed: Feb. 24, 1971

[21] Appl. No.: 118,285

[52] U.S. Cl............................................. 73/170 A
[51] Int. Cl. ...................... G01d 21/02, G01w 1/00
[58] Field of Search......................... 73/170 A; 340/2

[56] References Cited
UNITED STATES PATENTS

| | | | |
|---|---|---|---|
| 3,367,181 | 2/1968 | Adler | 73/170 A |
| 3,329,015 | 7/1967 | Bakke et al. | 73/170 A |
| 3,314,287 | 4/1967 | Blankers | 73/170 A |
| 3,534,599 | 10/1970 | Hoehne | 73/170 A |
| 3,449,950 | 6/1969 | Dale et al. | 73/170 A |
| 3,397,574 | 8/1968 | Soulant | 73/170 A |
| 3,351,856 | 11/1967 | Luttrell | 73/170 A X |
| 3,336,799 | 8/1967 | Kermode | 73/170 A |

FOREIGN PATENTS OR APPLICATIONS

| | | | |
|---|---|---|---|
| 1,533,367 | 7/1968 | France | 73/170 A |

*Primary Examiner*—James J. Gill
*Attorney*—Dennison, Dennison, Townshend & Meserole

[57] ABSTRACT

Apparatus for measuring the swell frequency and propagation direction of an ocean wave which comprises a swell collector including a water gauge which is partially submerged, the collector being connected by a rigid shaft to a ballast. A flexible connection is provided to an anchoring device and the collector encloses a magnetic compass and a counter. Remote readout means are also included.

5 Claims, 5 Drawing Figures

INVENTOR.
LADISLAS ERDELY

APPARATUS FOR RECORDING SWELL FREQUENCY AND PROPAGATION DIRECTION OF WAVES

This invention concerns an installation for swell frequency and propagation direction recording.

The invention relates generally to meteorology.

A maritime region affords, to the waves, an approach area of 400 grads, with each grad being equal to 0.01 of a right angle or 0.9 of a degree. It follows that one circumference equals 400 grads. It is advantageous to know the statistical distribution of the number and of the propagation direction of these waves, as well as the daily evolution of such data.

The swell is a manifestation of undulatory movement stirring the surface of the sea. It is noteworthy by its transmission speed and by the trochoidal shape of the movement of the molecules in play. The transmission of the waves is apparent only, and only the shape of the wave is transmitted. The stirring decreases as one gets farther from the surface of the water, and it is almost zero at a depth which is subject to the depth of the sea at a given point, but which is weak before this depth. The movement of the lower molecules is circular as is the movement of the upper molecules, but the orbital diameter decreases with the depth.

The establishment of coastal installations, such as ports, requires that one be able to foresee the restraints to which the works must be subjected corresponding to the presence of the swell: it is thus essential to measure the swell.

Methods are known for measuring the amplitude or range of the swell. The Oceanographic Institute of Wormley has perfected a process of evaluation of the swell by constant measurement of the height of water above a reference surface independent of the position of the ship carrying the installation.

Near the coast, the amplitude of the swell is evaluated by the measurement of pressure changes; thus is obtained a precision of one per cent on the height of the swell.

These prior art procedures allow the measurement of the height of the swell, but they give no indication on the direction of the swell, the knowledge of which, however, is essential.

French Pat. No. 1,533,367, filed June 7, 1967, in the name of the present applicant, describes an installation allowing the recording of swell direction. This apparatus, which comprises a water gauge fixed, in its center, by a Cardan shaft (universal joint) on a complicated and heavy substructure, is bearly workable, difficult to install, and is expensive to put into use.

The subject of this invention is made up of an installation for the simple, practical and inexpensive swell frequency and propagation direction recording.

The installation according to the invention comprises a swell collector made up of a water gauge which is partially submerged. It is characterized by the fact that this collector is connected, by a rigid shaft, to a ballast of which the outer form is identical to the submerged part of the first water gauge, the thrust center of the unit being itself connected by a flexible connection to an anchoring device and the collector enclosing a magnetic compass on a horizontal balance on a pivot and a counter of the number of movements of the water gauge with respect to the compass which gives in addition the direction of the said movements.

According to a desired accomplishment of the installation, the magnetic compass includes a rose formed by metallic blocks sealed in direction and in distance to the center, each block being capable, under the effect of a wave, of coming into contact with a corresponding ring-shaped band integral with the water gauge, and with only one band, thus forming an electric contact identifying the direction of the wave.

The invention thus defined is explained with the help of a nonlimiting example, shown in the attached drawings.

Figure 1:
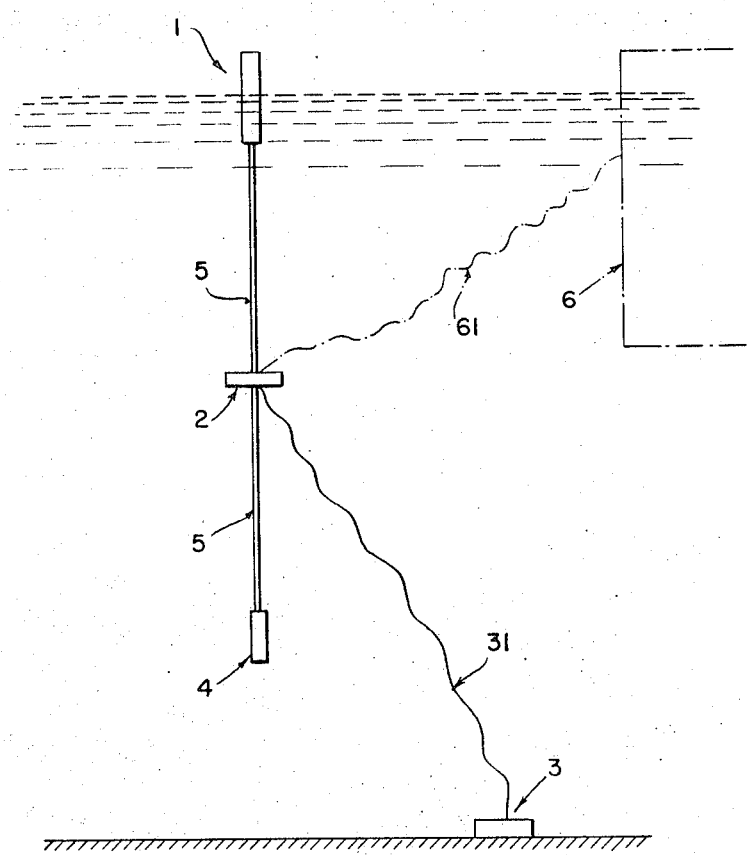
FIG. 1 represents schematically the entirety of the installation.
Figure 2:
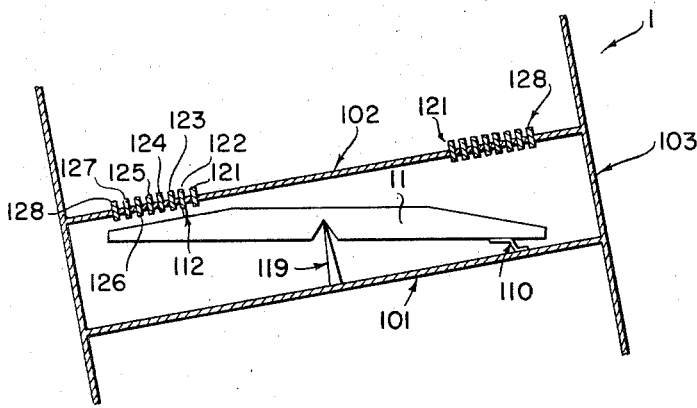
FIG. 2 represents, sectionally, the magnetic compass housed in the swell collector.
Figure 3:
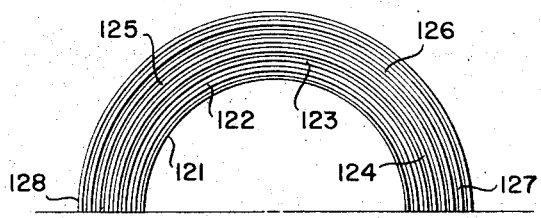
Figure 4:
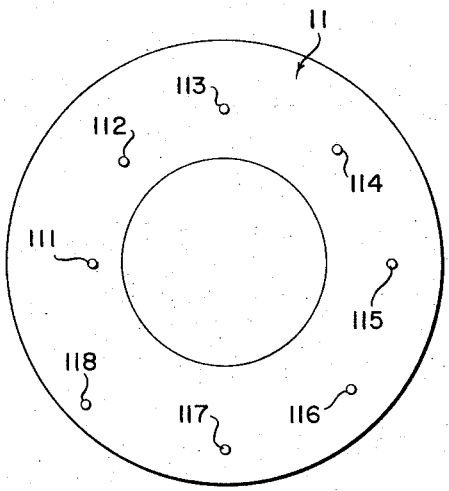

FIGS. 3 and 4 each represent a detail of FIG. 2, on a plane and from below.

Figure 5:
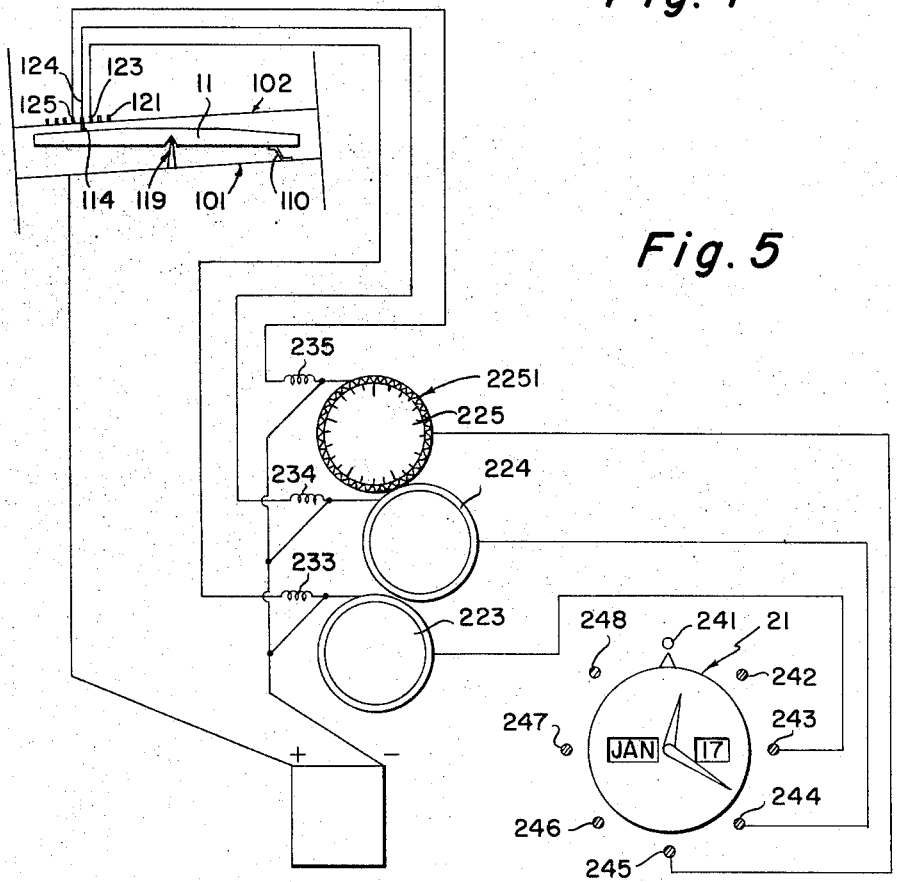

FIG. 5 is a schematic of the recording installation.

On these figures, the same reference marks represent the same elements.

The swell collector shown generally at 1 is made up of a water gauge enclosing a magnetic compass signal sender. In the example shown, this water gauge is formed of a metallic cylinder, preferably of aluminum or an alloy with aluminum base, about one half submerged. This cylinder shows a lower base 101, an upper base 102 and lateral walls 103.

This collector undergoes successive changes in place under the effect of the horizontal component of the swell, in the direction and in the sense of the propagation of the swell. But it is equally sensitive to the effect of the currents, and this effect must be eliminated. The collector must be sensitive to the effects of acceleration due to the swell, but not to the effects of speed due to the currents.

To this effect, a ballast is provided for, 4 with an exterior form identical to the submerged part of the water gauge 1 which is made up of the swell collector and connected to it by means of a rigid shaft 5. In the example shown, the ballast is made up of a metallic cylinder identical to the submerged part of the first cylinder, bearing a metallic shaft 5 embedded in the center of the lower base 101 of the cylinder 1. The cylinders are ballasted so that the unit possesses a slight positive floatability and a good vertical steadiness. The parameters having been chosen so that the ballast 4 is identical to that portion of gauge 1 which is submerged, the midpoint of shaft 5 defines a location which, if subjected to a thrust force, produces no appreciable rocking movement of gauge 1. It will be understood, therefore, that as used herein the interchangeable terms of "thrust center" or "center of thrust" may be applied to the apparatus embodying the invention in defining one of its physical characteristics.

In the center of thrust made up by the two cylinders and the shaft, a connection 31 is fastened connecting the unit to a bottom integral device 3, which can be made up of an anchoring device or of a mass solid enough to allow no shifting.

The two cylinders 1 and 4 are moved identically by a current which remains the same in the entire area occupied by said cylinders, and the unit is moved, under the horizontal acceleration effect of which the effect makes up the swell, by a rocking movement around its center of thrust, in the opposite direction from that of the swell.

The swell collector 1 encloses a magnetic compass of which the rose 11, balanced on a pivot 119, is made up of a certain number of blocks of metal, for example eight blocks 111 to 118, regularly distributed. The upper base 102 of the cylinder 1 is, for its part, equipped with eight concentric ring-shaped metallic bands 121 to 128. The blocks 111 to 118 are placed, with respect to the center of the rose 11, at scaled distances so that, if the collector takes a dip in the direction corresponding to the block 111, this block will come into contact with band 121 and only this band, but so that, if the collector takes the dip corresponding to block 112, this block will touch band 122 and this band only, and so on. The number of observation directions is limited to eight, which allows a determination of the direction by fraction of 50 grads but it is obvious that it is possible to adopt any other determination. The rose contains an electric contact 110 which assures the closing of the electric circuit.

In order for contact between blocks 111 to 118 and the corresponding bands 121 to 128 to be possible, it is important for one of the surfaces, upper surface of the rose 11 or lower surface of the base 102, to have the shape of a truncated cone. In the example shown, the upper surface of the rose has this shape.

A cylindrical container 2 enclosing the recording installation is foreseen at the middle of the shaft 5. the installation includes (FIG. 5) a motion picture camera, not shown, a date clock 21 showing the time and day, and ratchet wheels 221 to 228, of which only three 223 to 225 are shown to alleviate the figure. Each ratchet wheel has for example 250 notches, such as notch 251 of wheel 225, and is set in motion by an electromagnet 231 to 238, only 233 to 235 being shown. Each electromagnet is connected to the corresponding ring-shaped band 121 to 128, and supplied when this band is in contact with the corresponding block 111 to 118. Thus each of the ratchet wheels 221 to 228 is set in motion and advances one notch when the corresponding block of the rose touches the corresponding ring-shaped band, in such a way that each wave from any direction at all makes the corresponding wheel turn one notch. Each time that one of the wheels 221 to 228 has made a complete turn, that is, advanced 250 notches, a contact, not represented, integral to the corresponding wheel, acts on a corresponding signal lamp 241 to 248, preferably placed on a rim surrounding the clock 21. The same signal sets in motion the motion picture camera, which photographs the clock and its signals.

The functioning of the device is obvious. For example, when block 115 of the rose corresponds to direction "north," and block 111 corresponds to direction "south," a "north" swell will cause the closing of block 111, since the cylinder and not the rose is sloping.

If a north-west wave, for example, tilts the device, the block 118 comes into contact with the ring-shaped band 128, so that the electromagnet 238 is supplied and makes the ratchet wheel 228 turn one notch. When 250 north-west waves have appeared, the contact marking the end of the cycle of the wheel 228 is set in motion, lights the signal lamp 248 and actuates the motion picture camera.

By way of example, in the device described the collector 1 is an aluminum alloy cylinder 60 mm in diameter and 500 mm high, half above water. The shaft 5 is also of aluminum alloy and is 2 meters long. The metallic bands 121 and 128 are 1.5 mm wide and spaced 1 mm apart. The blocks 111 to 118 each are several mm high, 1 mm long and one-half mm wide. The ratchet wheels 221 to 228 are identical, their diameter being 40 mm with 250 notches. The motion picture camera operates with 16 mm film on reels of 120 meters, which for an average of 8 waves per minute, which means 1,500 pictures per month, represents 40 months of use. The unit is supplied by batteries housed in the shaft 5.

The two cylinders 1 and 4 and their connecting shaft 5 can have the same diameter; the unit then has the form of a smooth shaft. The magnetic compass can be placed, either in the shaft or in a container separate from the container 2 enclosing the recording installation.

In a variation meant for land or buoy recording 6, the end of cycle contact of each ratchet wheel drives an alternating voltage generator of which the frequency is different for each wheel and thus identifies the considered direction of the swell. This signal is transmitted by wire 61 or by radio to the place of recording where a sender conveys it in the direction of the swell. The means concerning signal sending are well known and do not need to be described in greater detail.

I claim:

1. Apparatus for swell frequency and propagation recording, comprising a swell collector including a water gauge (1) adapted to be partially submerged, said collector being connected by a rigid shaft (5) to a ballast (4) having an exterior shape identical to the submerged portion of said water gauge (1), the thrust center of said water gauge (1), said shaft (5), and said ballast (4) being connected by a flexible connection (31) to an anchoring device (3), and the collector enclosing a magnetic compass on a horizontal balance on a pivot (119), and means integrally mounted on said water gauge (1) and operatively associated with said magnetic compass for sensing the displacement and direction of displacement of said compass about a horizontal axis relative to said water gauge (1).

2. Apparatus according to claim 1 wherein the magnetic compass includes a rose (11) having provided thereon a plurality of metallic blocks (111–118) circumferentially spaced and located at different distances from the pivot (119), each block adapted under the effect of a wave to make contact with one of a plurality of corresponding ring-shaped bands (121–128), said bands being integral with the water gauge (1), the arrangement being characterized that the engagement of one of said blocks with one of said bands forms an electrical contact which identifies the direction of the wave.

3. Apparatus according to claim 2 wherein each ring-shaped band (121–128) is connected to an electromagnet (231–238) acting on a ratchet wheel (221–225), each ratchet wheel including an end-of-cycle contact connected to a signal lamp (241–249).

4. Apparatus according to claim 3 wherein said signal lamps (241–248) are arranged in a rosette around a date clock (21), a complete turn of each of said ratchet wheels illuminating a corresponding one of said signal lamps (241–248) and setting into operation a motion picture camera in whose range are placed the clock and its rosette of signals.

5. Apparatus according to claim 3 wherein the end-of-cycle contact of each ratchet wheel (221–228) is connected to an alternating voltage generator having various output frequencies, and a sender placed on land or on a buoy for transmitting the frequency of the signal which indicates the direction of the swell.

* * * * *